United States Patent
Engel

(10) Patent No.: US 7,171,086 B2
(45) Date of Patent: Jan. 30, 2007

(54) PROCESS FOR MANUFACTURE OF AN OPTICAL TRANSMISSION ELEMENT WITH SEVERAL DRY AND COMPRESSIBLE FILLING ELEMENTS AS WELL AS OPTICAL TRANSMISSION ELEMENT

(75) Inventor: Reinhard Engel, Grub am Forst (DE)

(73) Assignee: CCS Technology, Inc., Wilmington, DE (US)

( * ) Notice: Subject to any disclaimer, the term of this patent is extended or adjusted under 35 U.S.C. 154(b) by 123 days.

(21) Appl. No.: 10/795,853

(22) Filed: Mar. 8, 2004

(65) Prior Publication Data
US 2004/0177915 A1 Sep. 16, 2004

(30) Foreign Application Priority Data
Mar. 14, 2003 (DE) .................... 103 11 371

(51) Int. Cl.
*G02B 6/255* (2006.01)
(52) U.S. Cl. .................................... 385/100
(58) Field of Classification Search ........... 385/100
See application file for complete search history.

(56) References Cited

U.S. PATENT DOCUMENTS

| | | | | | |
|---|---|---|---|---|---|
| 4,504,298 | A | * | 3/1985 | Yokota et al. ................. | 65/388 |
| 4,767,184 | A | * | 8/1988 | Ogasawara et al. .......... | 385/105 |
| 4,913,517 | A | * | 4/1990 | Arroyo et al. ................ | 385/107 |
| 4,921,413 | A | * | 5/1990 | Blew ............................ | 425/71 |
| 5,007,703 | A | * | 4/1991 | Hale et al. ................... | 385/102 |
| 5,335,302 | A | * | 8/1994 | Polle ............................ | 385/100 |
| 5,393,536 | A | * | 2/1995 | Brandt et al. ................ | 425/112 |
| 5,698,615 | A | * | 12/1997 | Polle ............................ | 523/173 |
| 6,085,009 | A | * | 7/2000 | Risch et al. .................. | 385/109 |
| 6,151,434 | A | * | 11/2000 | Bonicel ........................ | 385/102 |
| 6,205,277 | B1 | * | 3/2001 | Mathis et al. ................ | 385/106 |
| 6,236,790 | B1 | * | 5/2001 | Okada et al. ................. | 385/102 |
| 6,253,012 | B1 | | 6/2001 | Keller et al. ................. | 385/109 |
| 6,349,161 | B1 | * | 2/2002 | Gleason et al. .............. | 385/113 |
| 6,421,486 | B1 | * | 7/2002 | Daneshvar et al. .......... | 385/109 |

(Continued)

FOREIGN PATENT DOCUMENTS

DE 2445532 1/1976

(Continued)

OTHER PUBLICATIONS

Corning, Fiber 101—selected concepts; http://www.corning.com/opticalfiber/discovery_center/tutorials/fiber_101/of_cc.asp.*

*Primary Examiner*—Frank G. Font
*Assistant Examiner*—Erin D. Chiem

(57) ABSTRACT

In a process for the manufacture of an optical transmission element with several optical waveguides and with a slot element each surrounding the optical waveguides, a filling compound is applied intermittently to the optical waveguides in a liquid state. The optical waveguides are subsequently fed into an extruder, where the extruder forms a slot element around the optical waveguides. The filling compound expands only within the formed slot element, so that interstices present in the cross-section level of the transmission element are penetrated and several dry, compressible filling elements are formed, disposed about the respective optical waveguides. With the process according to the invention, the cross-section of the extruded slot element is not compromised during the manufacturing process.

11 Claims, 1 Drawing Sheet

U.S. PATENT DOCUMENTS

| | | | |
|---|---|---|---|
| 6,445,868 B1 * | 9/2002 | Grunbeck et al. | 385/138 |
| 6,658,184 B2 * | 12/2003 | Bourget et al. | 385/100 |
| 2003/0035635 A1 * | 2/2003 | Chastain et al. | 385/112 |
| 2003/0103356 A1 * | 6/2003 | Hutchins et al. | 362/382 |

FOREIGN PATENT DOCUMENTS

| | | |
|---|---|---|
| DE | 2434280 A1 | 2/1976 |
| DE | 2743260 A1 | 4/1979 |
| DE | 2944997 B1 | 8/1980 |
| DE | 3628557 A1 | 3/1988 |
| DE | 3843778 A1 | 7/1990 |
| GB | 2227572 A * | 8/1990 |
| WO | WO 2005025842 A2 * | 3/2005 |

* cited by examiner

PROCESS FOR MANUFACTURE OF AN OPTICAL TRANSMISSION ELEMENT WITH SEVERAL DRY AND COMPRESSIBLE FILLING ELEMENTS AS WELL AS OPTICAL TRANSMISSION ELEMENT

FIELD OF THE INVENTION

The present invention concerns a process for the manufacture of an optical transmission element with several optical waveguides and with a slot element surrounding the optical waveguides, which encloses an interior space, as well as with several dry and compressible filling elements, which are arranged within the interior space of the slot element. The invention further concerns such an optical transmission element.

BACKGROUND OF THE INVENTION

Optical transmission elements such as optical cables or optical cores, f.e. in the form of so-called bundles, in general contain optical waveguides which are surrounded by a slot element enclosing them. A usual method for anchoring the optical waveguides in an optical transmission element is filling the slot elements with high-viscose, thixotropic or cross-linked filling compound. Such a filling compound has the disadvantage, that it can leak out or drip out in case of vertically hanging ends of the transmission element. Additionally, in case of splitting the transmission element during installation, leaking filling compound can lead to contamination and handling problems on the part of the installation personnel.

Such a filling of the optical transmission element has the advantage, that during the manufacturing process of the optical transmission element during the extrusion of the slot element in the form of a tube, the still soft cladding of the tube is supported by the filling compound and the round cross-section remains stable until curing occurs. Furthermore, water, which penetrates due to damage to the transmission element into the tube, is prevented by the filling compound from further penetration.

Water tightness of the transmission element can also be produced, when the slot tube of the transmission element is only filled with filling compound in sections or with several dry and compressible filling elements, which provides the additional advantage, that costs of filling compound can be reduced. However, a disadvantage of this sectional filling of the transmission element is a discontinuation of the support effect for the still soft slot tube immediately after extrusion. Without additional procedures, this can lead to sections of non-round slot tubes, which at least complicate or prevent a symmetrical cable construction or core construction, respectively.

In order to get a round cross-section of an optical transmission element without continuous filling compound, so-called outer calibration can be used as an additional procedure. With this, the soft slot tube is pulled through a slot, where there is a vacuum relative to the environment. This vacuum sucks the slot walls towards the outside against the inner contours of so-called disc tips, past which they are pulled and then cured. Such outer calibrations devices are generally technically difficult to produce and have to be calibrated for each outer diameter of a transmission element.

SUMMARY OF THE INVENTION

The present invention has the objective to specify a process for the manufacture of an optical transmission element, with which an optical transmission element with an extruded slot element filled in sections can be produced without the cross-section of the slot element being changed during the manufacturing process.

Beyond this it is the objective of the present invention to specify a corresponding optical transmission element.

This objective is achieved by a process for the manufacture of an optical transmission element according to patent claim 1 and by an optical transmission element according to patent claim 7.

In the process according to the invention a filling compound is intermittently applied in a liquid state to the optical waveguide being guided to an extruder. The optical waveguides with the applied filling compound are subsequently fed into the extruder, where the extruder forms a slot element around the optical waveguides. The applied filling compound expands within the formed slot element, where the interstices present in the interior are penetrated on the cross-section level by the filling compound and where several dry, compressible filling elements are formed in the final state, which each surround the optical waveguides.

With the use of the process according to the invention, the cross-section of the optical transmission element with the extruded slot element is not impaired during the manufacturing process. This is accomplished by the fact, that the filling compound applied in a liquid state is comparatively compactly placed on the optical waveguides and bathes them and only expands within the formed slot element, so that the slot element can cure after extrusion, before the expanding filling compound comes in contact with the inner wall. This foaming of the filling compound is delayed long enough until the liquid filling compound is located within the extruded slot elements. In particular, the filling compound within the formed slot element begins to expand only after leaving the extruder, preferably only then, when the slot element is in a cured state. Polyurethane or silicones can possibly be used for the filling compound.

Thus the end product is an optical transmission element with several optical waveguides and a slot element surrounding the optical waveguides, where several dry and compressible filling elements are placed within the interior of the slot element, which are formed by a material, which expands in the interior. A defined contact pressure is exerted by the filling elements in the foamed state against the slot element and against the optical waveguides for anchoring the same in the longitudinal direction of the transmission element, where change of position of the optical is nevertheless possible. The filling elements each surround the optical waveguides, and interstices present between the optical waveguides in the cross-section level of the optical transmission element are completely filled and penetrated by the subsequently expanding filling compound. In addition, the optical waveguides and the slot element are essentially in all-around contact with the filling elements.

Further advantageous constructions and developments of the invention are given in the sub claims.

BRIEF DESCRIPTION OF THE FIGURES

The invention is further explained by means of the figures displayed in the drawing, which show construction samples of the present invention.

Shown is.

DETAILED DESCRIPTION OF THE INVENTION

Figure 1:
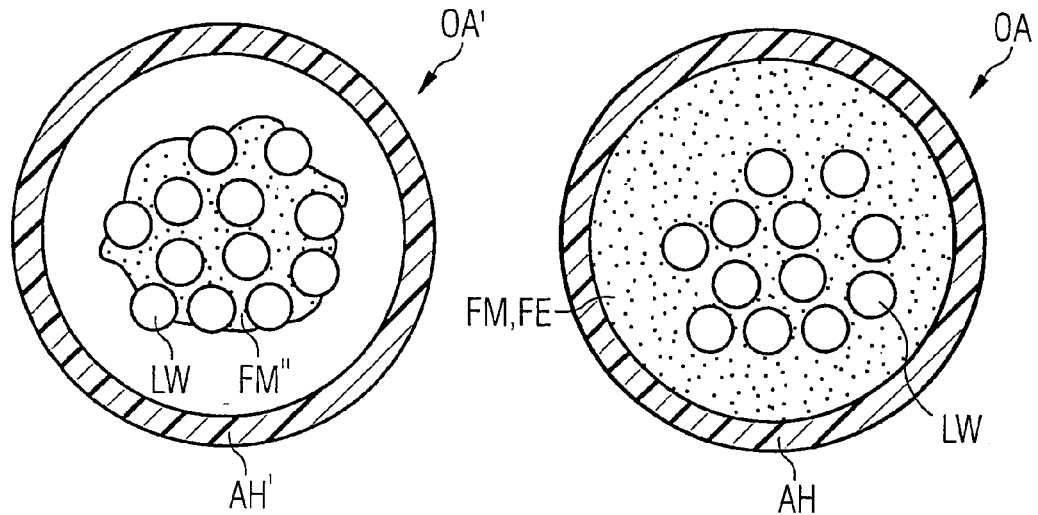
FIG. 1 a cross-section diagram of an optical transmission element according to the invention during manufacture and in the final state FIG. 2 a longitudinal section of an optical transmission element according to the invention in the final state, FIG. 3 a schematic diagram of a manufacturing line for the manufacture of an optical transmission element according to the process of the invention.

In FIG. 1 a cross-section diagram of an optical transmission element according to the invention is shown during manufacture (left figure) and in the final state (right figure). In the left diagram of FIG. 1 it can be seen, that several optical waveguides LW are arranged within the slot element AH', which is formed around the optical waveguides LW. The optical waveguides LW in this sample are optical fibers, which are arranged as a fiber bundle within a bundle core with the core cladding AH'. The core cladding AH' of the bundle core OA' is still in a relatively soft state and is not yet in contact with the filling compound FM' applied to the fiber bundle in a liquid state. An alternate construction gives optical cores with several fibers, which are each enclosed, as optical waveguides, where the cores are arranged as core strands within the cable jacket with the cladding AH'. The invention is further described in the following by means of the first construction sample.

In the right part of FIG. 1 the cured bundle core OA is shown in contrast, where the core cladding AH is in a rigid state. By means of the meanwhile foamed filling compound FM a filling element FE is formed in the final state, which exerts a defined contact pressure against the core cladding AH and against the optical fibers LW for anchoring of the same in the longitudinal direction of the bundle core OA, where change of position is nevertheless possible. By the subsequent expansion of the filling compound FM interstices present between the optical fibers LW in the cross-section level of the bundle core OA are completely filled and penetrated, as well as the optical fibers LW and the core cladding AH being essentially in all-around contact. Filling compounds based especially on polyurethane or silicones can be used here.

Figure 2:
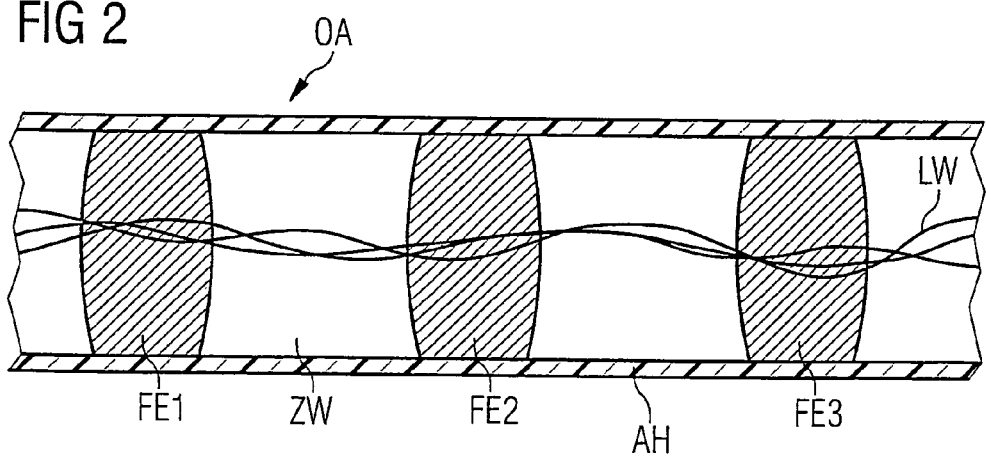

FIG. 2 shows a longitudinal section of an optical transmission element according to the invention according to FIG. 1 in the final state. By means of the filling compound applied intermittently to the optical fibers LW, which expands within the core cladding AH, several dry and compressible filling elements FE1 to FE3 are formed, which surround the optical fibers LW and completely fill and penetrate interstices present between the optical fibers in the cross-section level of the bundle core OA. Between the filling elements FE1 to FE3, intermediate interstices ZW not occupied by filling elements are arranged. Thus a dry bundle core OA is created, in whose interior filling elements FE1 to FE3 functioning as partitions are arranged, which provide an effective longitudinal water tightness for the bundle core. To enhance this characteristic, the filling elements FE1 to FE3 can contain a medium for sealing against penetrating water, which swells when water enters.

Figure 3:
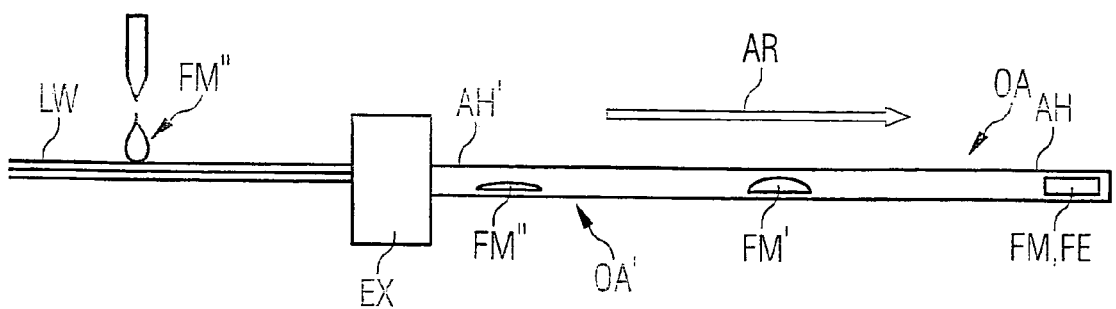

FIG. 3 shows a schematic diagram of a manufacturing line, which manufactures an optical transmission element especially in the form of a bundle core by to the process according to the invention. A bundle of optical fibers LW is guided to an extruder EX. During this process a filling compound FM" is intermittently applied to the fiber bundle in liquid state. The fiber bundle is subsequently fed into the extruder EX, where the core cladding AH' is formed by the extruder EX around the fiber bundle. The filling compound FM" is employed as a wetting agent and also penetrates into the cavities between the fibers of the fiber bundle. The filling compound FM" is applied intermittently and in a thin layer, which is not yet sufficient for sealing the bundle core. After a preset delay period and/or with assistance of heat supply the still liquid filling compound FM" (foaming filling compound FM') expands, where the timing of the foaming is selected in such a way, that the core cladding AH' can no longer be deformed by the expanding foam. In particular, the filling compound FM' begins to expand only after leaving the extruder EX, preferably only then, when the bundle core AH is in a rigid state. Immediately after leaving the extruder EX the newly extruded core cladding AH is still in a soft state.

The delay period between the application of the filling compound and the beginning of the expansion of the filling compound is set depending on the pay-off speed of the bundle core AH, which is taken off in the pay-off direction AR. The delay period is preferably set between one and a maximum of 300 seconds. The expanding filling compound FM", FM' penetrates interstices present in the interior of the core cladding AH in the cross-section level of the bundle core and forms a dry, compressible filling element FE in the final state, which is formed by the completely expanded filling compound FM.

The application of the filling compound, which forms the later filling elements, onto the incoming optical waveguides in front of the extruder has the additional advantage, that the exact dosage is significantly simplified. Suitable dosing valves and dosing pins, even of larger design, can be brought into immediate proximity of the optical waveguides in front of the extruder. Behind the extruder it can be implemented only within a hollow tube and is technically difficult due to the small physical dimensions.

The invention thus makes it possible to manufacture an optical transmission element with a slot tube filled in sections, without changing the cross-section of the slot element by the sectional filling during manufacture. Thus an outer calibration required until now can be eliminated and the material-saving sectional filling of the slot element can be used. Besides the sectional filling of the slot element, the expanding of the filling compound provides a further saving in material.

The expanded filling compound adds only a small weight increase to the finished transmission element. It can be removed from the optical waveguides easily and completely without additional tools and thus eases the installation and connectorization of a cable. The expanded filling compound is made in such a way, that it seals the interstices within the fiber bundle and between fiber and slot wall watertight in the cross-section level of the bundle core, but that the fibers can be pulled through it easily. The filling compound stopper in the form of each filling element remains after pulling out the fibers. The fibers are clean and without residue and can be used immediately for further installation (splicing, depositing in cartridges) without additional cleaning procedures.

That which is claimed:

1. A process for the manfacture of an optical transmission element having at least one optical waveguide with a slot element surrounding the at least one optical waveguide and defining an interior space, the process comprising the steps of:

applying a filling compound intermittently to the at least one optical waveguide, wherein the filling compound is applied in a liquid state;

feeding the at least one optical waveguide into an extruder to form a slot element around the at least one optical waveguide;

wherein the filling compound expands within the slot element, thereby forming a plurality of dry, compressible elements that are disposed about the at least one optical waveguide.

2. The process according to claim 1, wherein the filling compound is selected from the group consisting of polyurethane based materials and silicone based materials.

3. The process according to claim 1, wherein the slot element cross-section is not being changed by the expanding of the filling compound.

4. The process according to claim 1, wherein the filling compound begins to expand within the slot element after leaving the extruder.

5. The process according to claim 4, wherein a delay period between applying the filling compound and the beginning of expansion of the filling compound is between about one second and about 300 seconds.

6. The process according to claim 1, wherein the expansion of the filling compound is aided by heat.

7. An optical transmission element, comprising:
at least one optical waveguide being disposed within a slot element, wherein the slot element defines an interior space therein;
a plurality of dry and compressible filling elements, which are arranged in the interior space and are formed by material expanding within the interior space, the plurality of filling elements are arranged in the longitudinal direction of the optical transmission element with intermediate interstices therebetween not being occupied by filling elements where a defined contact pressure is applied by the filling elements against the slot element and against the at least one optical waveguide for anchoring them in longitudinal direction of the transmission element and where position changes of the at least one optical waveguide are possible;
wherein the filling elements are disposed about the at least one optical waveguide and completely fill respective cross-sections of the interior space of the slot element.

8. An optical transmission element according to claim 7, wherein the filling compound is selected from the group of consisting of polyurethane based materials and silicone based materials.

9. An optical transmission element according to claim 7, wherein the filling elements are applied to the at least one optical fiber in a liquid state.

10. An optical transmission element according to claim 7, wherein the filling elements further including a material that swells during water penetration.

11. An optical transmission element according to claim 7, wherein the filling elements are formed so that they can be removed from the at least one optical waveguide easily and completely without using additional tools.

* * * * *